United States Patent [19]

Carkoski

[11] 4,336,865
[45] Jun. 29, 1982

[54] CARTRIDGE CASE LUBRICATOR

[76] Inventor: Eugene T. Carkoski, 7560 Parker St., Omaha, Nebr. 68114

[21] Appl. No.: 207,381

[22] Filed: Nov. 17, 1980

[51] Int. Cl.³ .................. F42B 31/00; F16N 3/00
[52] U.S. Cl. .......................... 184/14; 42/90; 86/19; 102/511
[58] Field of Search .............. 184/14, 15 R, 16; 86/19; 42/90; 102/511

[56] References Cited

U.S. PATENT DOCUMENTS

| | | | |
|---|---|---|---|
| 294,176 | 2/1884 | Alexander | 86/19 X |
| 296,440 | 4/1884 | Oliver | 184/15 R X |
| 974,784 | 11/1910 | Frommer | 86/19 U X |
| 1,322,271 | 11/1919 | Thompson | 86/19 |
| 2,418,646 | 4/1947 | Janson | 184/14 X |
| 2,847,880 | 8/1958 | Neidig | 184/15 R X |
| 3,398,629 | 8/1968 | Olson | 86/19 |
| 4,063,617 | 12/1977 | Shenk | 184/15 R |

*Primary Examiner*—David H. Brown
*Attorney, Agent, or Firm*—Hiram A. Sturges

[57] ABSTRACT

A cartridge case lubricator having a table supportable frame, an oil absorbent member supported in a recess in the frame, whereby the cartridge case can be passed downwardly through an opening in the absorbent member for lubricating the cartridge case, the underside of the absorbent member being supported by a support having a passage therethrough and a frame having an open space beneath a hole under the support so that the operator can easily remove the lubricated casing.

6 Claims, 6 Drawing Figures

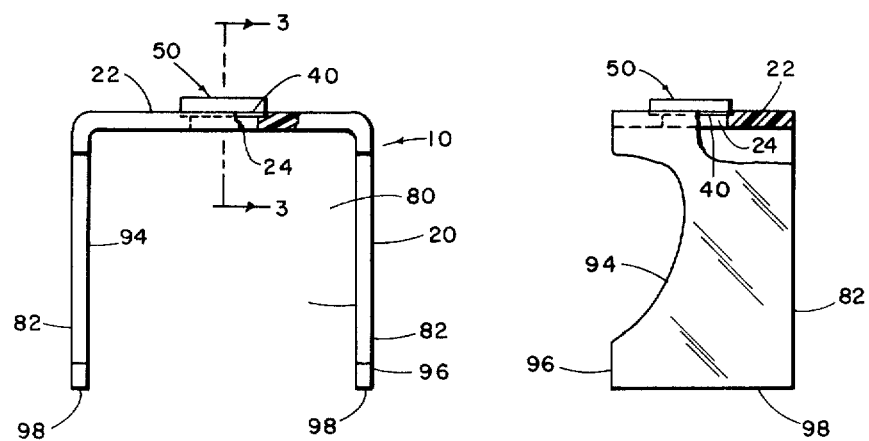
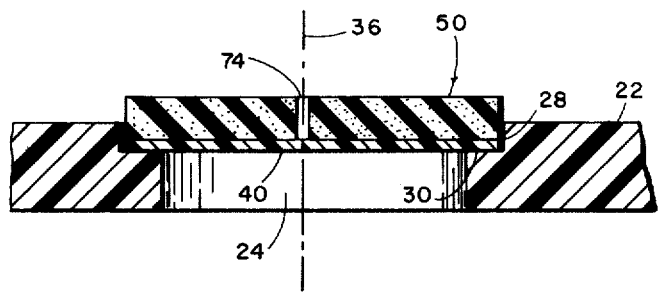
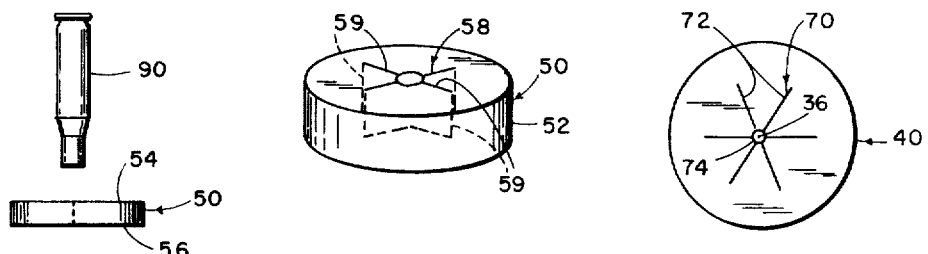
FIG.1  FIG.2  FIG.3  FIG.4  FIG.5  FIG.6

CARTRIDGE CASE LUBRICATOR

BACKGROUND OF THE INVENTION

In the prior art, cartridge cases have been lubricated by rolling them across a surface having upon it a lubricant, but this does not properly uniformly lubricate the smaller diametered part of a cartridge casing. This is a very important problem because a single concentrated droplet of lubricant on an inclined part of a cartridge casing can cause the casing to become dented during the placing of the casing in a re-sizing die because of the high pressure needed to press a casing through such a die and because of the incompressibility of lubricant.

The dent formed in a casing where a droplet of lubricant is disposed can sometimes weaken the casing so that it will burst. This is a safety hazard for the shooter. It also leads to bad accuracy in the firing.

The rupturing of a casing causes explosion gases to come around the edge of the casing and come with sufficient force to pass by the bullet as well. This leads to inaccurate firing.

There is also the nuisance that a ruptured casing must be removed from the gun by a gunsmith, involving a costly trip and placing the gun out of competitive action until it is fixed.

Another problem of the prior art is that ruptured casings spoil the competition by introducing inaccuracies right when the shooter is in a highly competitive contest.

Since conceiving my invention, I have become aware from searching of a lubricator proposal in the prior art in which a casing is passed horizontally through an absorbent piece of material held between relatively flat first and second housing portions. Such a construction requires many machine screws, many holes and much threading and much costly assembly.

It is, therefore, one of the objects of this invention to eliminate this costly assembly and the many costly parts by providing a lubricator with a frame that will stand freely on its own frame right-side up on a table with its absorber horizontally arranged for the passage of a casing therethrough in a vertical direction from the upper side. With my concept the frame can be mass-produced by injection molding so as to have a hole through it extending vertically with a recess above the hole which can be expected to retain a support without any screws because all pressure comes downward from the top.

Another objective is to utilize the resiliency of the absorber and a tight fit of the absorber in its rescess to hold the absorber in assembly with the frame, the support being held in assembly by being contained between the absorber and the frame.

SUMMARY OF THE INVENTION

The main goal of this invention is to provide a cartridge case lubricator having a table supportable frame, an oil absorbent member supported in a recess in the frame, whereby the cartridge case can be passed downwardly through an opening in the absorbent member for lubricating the cartridge case, the underside of the absorbent member being supported by a support having a passage therethrough and a frame having an open space beneath a hole under the support so that the operator can easily remove the lubricated casing.

Another objective is to provide for the opening through the absorbent member to have radial slits standing outwardly from a center of the opening.

Yet another goal is to provide the support under the absorbent member with slits therethrough extending out from a center of a passage therethrough, the support being formed of flexible material with the portions between the slits being able to bend as a cartridge passes therethrough.

Yet another goal of the invention is to provide for the absorbent member to be large enough and resilient enough to be held in its recess by pressure against the walls of the recess because of its being of larger size than the recess.

BRIEF DESCRIPTION OF THE DRAWINGS

FIG. 1 is a front elevation of the lubricator of this invention with a portion broken away to show the interior.

FIG. 2 is a right elevation of the lubricator with an upper portion broken away.

FIG. 3 is a sectional view taken along the line 3—3 of FIG. 1 with the right leg portion broken away and front and rear portions of the top portion of the frame broken away.

FIG. 4 shows a cartridge case in its position about to be moved downwardly through the oil absorbent member of this invention, other parts of the lubricator not being shown.

FIG. 5 is a perspective view of the oil absorbent member of this invention with portions of slits being shown in dotted lines.

FIG. 6 is a top plan view of the support.

DESCRIPTION OF THE PREFERRED EMBODIMENT

The cartridge case lubricator of this invention is generally indicated at 10 in FIG. 1 and comprises a frame 20 having an upper frame portion 22 which, as best seen in FIG. 2, has a hole 24 extending vertically therethrough.

The upper frame portion 22 further has a recess 28 extending partially through the upper frame portion 22 from its upper side. The recess 28 overlaps the hole 24 so as to provide an upwardly facing shoulder 30. Since the recess 28 is preferably cylindrical and the hole 24 is preferably likewise cylindrical both about an axis 36, therefore, the shoulder 30 is circular at its outermost and innermost edges. The shoulder 30 is preferably disposed on a horizontal plane.

A support 40 extends across the hole 24 horizontally.

The shoulder 30 is of adequate size and position and the support 40 laps the shoulder 30 sufficiently that the support 40 is itself supported by the shoulder against substantial downward pressure on the support 40, such as is involved in the operation of the lubricator.

Preferably, however, the support 40 laps the shoulder 30 on all sides of the axis 36.

An oil absorber 50, which is preferably a sponge made of thermoplastic material, is disposed above and rests on the support 40. The absorber 50 preferably has a size at times when it is free of the frame 20 which is of larger diameter than the diameter of the recess 28 so as to form a snug fit therein to retain the parts together.

The absorber 50 has an outer wall 52 which is cylindrical in shape and has planar upper and lower sides, seen at 54 and 56 in FIG. 4.

The absorber has an opening therethrough generally indicated at 58 which can be simply in the form of two criss-crossed slits 59 which extend completely through the absorber 50 vertically.

The support 40 is provided with a passage therethrough generally indicated at 70 in FIG. 6, and the passage 70 is disposed in at least partial registry with the opening 58 in the absorber 50.

The area of the opening 58 in the absorber 50 is of much lesser size as seen from the top thereof than the area of the hole 24 as the hole 24 is seen from the bottom of the frame 20.

The passage 70 is preferably made of a plurality of criss-crossed slits 72 extending vertically through the support 40 and extending radially outwardly from the axis 36 at which there is a centerhole 74 extending through the suppot 40.

The frame 20 has a large open space 80 beneath the hole 24 and disposed between leg portions 82 of the frame whereby a cartridge case, such as shown in FIG. 4 at 90, can be passed through the opening 58 and through the passage 70 and through the hole 24 and grasped while it is disposed in the space 80 by the operator's hand for removal of the cartridge case from the lubricator.

To provide the operator with extra freedom for his hand motion, large indentation 94 are provided in the forward side 96 of each of the legs of the frame 20. The undersurface 98 of the frame 20 is represented by the undersurfaces of each of the legs 82, and the undersurfaces 98 have lowermost portions which lie on substantially a horizontal plane for support by a horizontal surface, such as a table top.

The opening 58 and the passage 70 and the hole 24 are all of large enough size so that at least one size of cartridge, and preferably all cartridges in that size range, can be effectively lubricated by passing the cartridges one at a time therethrough from the upper side thereof.

The support 40 is preferably made of Nylon or other flexible material and thin enough to be flexible so that portions between the slits 72 can flex to allow the cartridge to go by. The length of that portion of each slit 72 which extends outwardly from the axis 36 is three-eighths of an inch, but three-tenths of an inch is sufficient for the range of cartridge sizes between 0.17 calibre and 0.45 calibre.

The absorber 50 is preferably of a diameter of one and three-fourths inches and the hole 24 of a diameter of one and one-eighth inches for this range of calibre cartridges. The hole 74 is of 0.17 inches diameter.

The absorber 50 could be sponge rubber, or sponge plastic, either one, and even a piece of felt would work. I have found that the lubricator of this invention adequately lubricates the neck of the case and the inclined should of the case as well as the larger body of the case.

The slits in the absorber 50 are very important for making possible the lubrication properly of a large range of sizes of casings. The slits in the support are important because the absorber is relatively weak in nature and it needs support, and yet, without the flexibility of portions of the support that are between the slits so that they can yield, casings of larger size could not pass through. In this way, a versatile absorber is achieved.

I claim:

1. A cartridge case lubricator comprising a frame having lowermost portions on a substantially horizontal plane for support by a horizontal surface, an upper frame portion having a hole extending vertically therethrough, a recess means extending partially through said upper frame portion from its upper side, said recess means overlapping said hole, said recess means providing upwardly facing shoulder means on sides of said hole, a support extending across said hole and lapping said shoulder means, said shoulder means being of adequate size and position and said support lapping said shoulder means sufficiently that said support is itself supported by said shoulder means against substantial downward pressure on said support, an oil absorbent means disposed above and supported by said support, said oil absorbent means having an opening extending vertically therethrough, the area of said opening being of much lesser size as seen from the top thereof than the area of said hole as said hole is seen from the bottom of the frame, said support being provided with a passage therethrough disposed in at least partial registry with said opening in said absorbent means, said opening and said passage and said hole all being of large enough size so that at least one size of cartridge from the cartridge size range of 0.17 to 0.45 calibre can be effectively lubricated by passing said cartridge therethrough, said frame having a large open space therein beneath said hole whereby a cartridge case can be passed through said opening and said passage and said hole and grasped by an operator's hand in said space for removal from said lubricator.

2. the cartridge case lubricator of claim 1 having said opening having substantially radial slits extending outwardly from a center of said opening to lubricate evenly a large range of casing sizes.

3. The cartridge case lubricator of claim 1 having said opening, said passage and said hole all being of large enough size so that all cartridge sizes in the range of 0.17 to 0.45 calibre can be effectively lubricated by passing therethrough.

4. The cartridge case lubricator of claim 1 having said absorbent means being resilient and being slightly larger than said recess so as to press against the walls of said recess to hold said absorbent means in said recess.

5. The cartridge case lubricator of claim 1 having said support being made of a flexible material and said passage comprising slits extending out from a center to define flexible fingers therebetween.

6. The cartridge case lubricator of claim 5 having said support made of Nylon.

* * * * *